(12) United States Patent
Kitami et al.

(10) Patent No.: US 6,372,380 B1
(45) Date of Patent: Apr. 16, 2002

(54) NONAQUEOUS ELECTROLYTE SECONDARY BATTERY

(75) Inventors: Tsuyoshi Kitami; Hiromi Suzuki, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/558,370

(22) Filed: Apr. 26, 2000

(30) Foreign Application Priority Data

Apr. 26, 1999 (JP) .............................. 11-117893

(51) Int. Cl.[7] .............................. H01M 02/28
(52) U.S. Cl. .................. 429/161; 429/211; 429/146; 429/186; 429/247
(58) Field of Search .................. 429/176, 186, 429/161, 211, 131, 135, 146, 247, 233, 163, 137

(56) References Cited

U.S. PATENT DOCUMENTS

| | | |
|---|---|---|
| 5,670,272 A | 9/1997 | Cheu et al. |
| 5,800,939 A * | 9/1998 | Mishina et al. ............... 429/57 |
| 5,871,861 A * | 2/1999 | Hirokou et al. ............. 429/149 |
| 5,989,743 A * | 11/1999 | Yamashita ................. 429/129 |

FOREIGN PATENT DOCUMENTS

WO 99/05743 2/1999

* cited by examiner

Primary Examiner—Stephen Kalafut
Assistant Examiner—R. Alejandro
(74) Attorney, Agent, or Firm—Young & Thompson

(57) ABSTRACT

The present invention provides a nonaqueous electrolyte secondary battery comprising: a battery case; a battery element accommodated in the battery case, the battery element comprising laminations of a first polarity type electrode, a second polarity type electrode and a separator sandwiched between the first polarity type electrode and the second polarity type electrode, the first polarity type electrode comprising a first polarity type collector which is provided with at least a first polarity type electrode active material layer except for a first side region extending along one side of the first polarity type collector, and the second polarity type electrode comprising a second polarity type collector which is provided with at least a second polarity type electrode active material layer except for a second side region extending along one side of the second polarity type collector, the first side region of the first polarity type collector projecting from first side edge of the separator and the second side region of the second polarity type collector projecting from second side edge of the separator, so that the battery element has a bottom portion which comprises the first side region of the first polarity type collector and a top portion which comprises the second side region of the second polarity type collector; a bottom conductive elastic material on a bottom of the battery case, and the bottom conductive elastic material being in contact with a substantially entire part of the bottom portion of the battery element; and a top conductive elastic material on a top of the battery case, and the top conductive elastic material being in contact with a substantially entire part of the top portion of the battery element.

16 Claims, 5 Drawing Sheets

NONAQUEOUS ELECTROLYTE SECONDARY BATTERY

BACKGROUND OF THE INVENTION

The present invention relates to a secondary battery using a nonaqueous electrolyte, and more particularly to a non-aqueous electrolyte secondary battery capable of charge and discharge at a high current density.

A lithium ion secondary battery is a typical one of nonaqueous electrolyte secondary batteries. The lithium ion secondary battery uses a negative electrode and a positive electrode, wherein the negative electrode may be doped and de-doped with lithium, and the positive electrode contains a transition metal oxide. The negative electrode is shaped in sheet. The sheet-shaped negative electrode comprises a sheet-shaped negative electrode collector applied with a negative electrode active material.

The positive electrode is shaped in sheet. The sheet-shaped positive electrode comprises a sheet-shaped positive electrode collector applied with a positive electrode active material. The lithium ion secondary battery has a lamination structure of the negative and positive electrodes which are separated through a separator. The lamination structure may be coated with a packaging material. Alternatively, the lamination structure may be rolled to form a cylindrically shaped roll structure which is contained in a battery case.

The later one having the cylindrically shaped roll structure contained in a battery case is particularly superior in sealing characteristic. The cylinder shape allows a uniform battery reaction over position of the lamination structure. The nonaqueous electrolyte secondary battery is used for obtaining a large current. The cylinder shape is important for the nonaqueous electrolyte secondary battery. The cylindrically shaped nonaqueous electrolyte secondary battery is expected as a large battery for driving an electric car or an electric auxiliary bicycle.

FIG. 1 is a fragmentary cross sectional elevation view illustrative of a conventional cylindrically shaped nonaqueous electrolyte secondary battery.

A battery 51 has a battery case 52 which accommodates a battery element 56 which comprises a roll structure of laminations of sheet-shaped negative and positive electrodes 53 and 54 separated by a separator 55, wherein the negative electrode 53 comprises a negative electrode collector provided with a negative electrode active material, whilst the positive electrode 54 comprises a positive electrode collector provided with a positive electrode active material. The separator 55 is wider than the negative and positive electrodes 53 and 54. The battery case 52 is cylindrically shaped to accommodate the cylindrically shaped roll structure of the laminations. The lamination structure is rolled around a center axis of the cylinder A width direction of the separator 55 and the negative and positive electrodes 53 and 54 corresponds to the direction of the center axis of the cylinder. The separator 55 is wider than the negative and positive electrodes 53 and 54, so that opposite sides of the cylindrically shaped battery element 56 comprise side portions of the separator 55, wherein the side portions of the separator 55 project from the side portions of the negative and positive electrodes 53 and 54. The battery case 52 may serve as a negative electrode terminal. In this case, the sheet shaped negative electrode is attached with a stripe-shaped negative electrode lead 57. This stripe-shaped negative electrode lead 57 is welded to an inner wall of the battery case 52. A positive electrode lead 58 is attached to a battery header 59. The battery header 59 serves as a positive electrode terminal.

The battery header 59 has a pressure release valve which releases an internal pressure of the battery if the internal pressure is excessively increased.

In the above battery, the stripe-shaped electrode leads are attached to the collectors. If the large current is fetched from the battery, a current distribution is different between a position adjacent to an attachment position of the electrode lead and a position far from the electrode lead. In Japanese laid-open patent publication No. 7-192717, it is disclosed that in order to solve the above problem, the electrode lead is used which has a large sectioned area. Also, it is disclosed that a large number of the electrode leads are attached, thereby making an attachment portion of the electrode lead thick, resulting in a non-uniform distance between the positive and negative electrodes in the form of the roll structure. This provide undesired influence to the characteristics of the battery, In Japanese laid-open patent publication No. 6-36756, it is disclosed that in order to fetch the current uniformly over the positions of the roll structure, a nickel-cadmium battery of a sintered type is provided wherein a large number of plate-shaped collectors are connected to a sealing cap provided in the battery case, and a metal spring is provided to contact with the sealing cap and the collectors to form a conduction path between the sealing cap and the collectors.

In Japanese laid-open utility model publication No. 5-45898, it is disclosed that a metal foam is provided to form a current divided path.

The formation of the current divided path provides an effect of reduction in IR loss as compared to when only the electrode leads are provided, but this effect is not so different from when a large number of the electrode leads is provided. If this technique is applied to the nonaqueous electrolyte secondary battery, then problems are raised with a possible breaking of connecting part of the electrode leads due to vibration of the battery.

In order to connect the electrode leads to the positive electrode collector and the negative electrode collector, it is necessary that a positive electrode active material and a negative electrode active material are applied on the positive electrode collector and the negative electrode collector before the metal strips are bonded by a welding method to active-material-stripped faces of the connecting parts of the electrode leads. In order to reduce the IR loss, a large number of the electrode leads are plugged to take a long time for connecting the electrode leads. This means that the fabrication processes are complicated.

In Japanese laid-open patent publication No. 9-306465, there is disclosed a nickel-hydrogen secondary battery using a winding type battery element, wherein the number of the connecting parts, per one turn or one round, of the electrode plates connected to the collector terminal is increased from an innermost position to an outermost position so as to improve uniformity of the current fetch from the roll body. It is, however, necessary that the electrode plates are bonded by a welding method to the collector terminal. This bonding process makes long the necessary time for the fabrication of the battery.

In the above circumstances, it had been required to develop a novel nonaqueous electrolyte secondary battery free from the above problem.

SUMMARY OF THE INVENTION

Accordingly, it is an object of the present invention to provide a novel nonaqueous electrolyte secondary battery free from the above problems.

It is a further object of the present invention to provide a novel nonaqueous electrolyte secondary battery which is capable of reducing an IR loss even in a highly efficient discharge process.

It is a still further object of the present invention to provide a novel nonaqueous electrolyte secondary battery preventing a conductive connection between a battery element and a battery case from being broken due to vibration of the battery.

It is yet a further object of the present invention to provide a novel nonaqueous electrolyte secondary battery having a highly reliability.

It is yet a further object of the present invention to provide a novel nonaqueous electrolyte secondary battery which allows simplifying the fabrication processes.

It is yet a further object of the present invention to provide a novel nonaqueous electrolyte secondary battery which allows shortening the necessary time for the fabrication processes.

The present invention provides a nonaqueous electrolyte secondary battery comprising: a battery case; a battery element accommodated in the battery case, the battery element comprising laminations of a first polarity type electrode, a second polarity type electrode and a separator sandwiched between the first polarity type electrode and the second polarity type electrode, the first polarity type electrode comprising a first polarity type collector which is provided with at least a first polarity type electrode active material layer except for a first side region extending along one side of the first polarity type collector, and the second polarity type electrode comprising a second polarity type collector which is provided with at least a second polarity type electrode active material layer except for a second side region extending along one side of the second polarity type collector, the first side region of the first polarity type collector projecting from first side edge of the separator and the second side region of the second polarity type collector projecting from second side edge of the separator, so that the battery element has a bottom portion which comprises the first side region of the first polarity type collector and a top portion which comprises the second side region of the second polarity type collector; a bottom conductive elastic material on a bottom of the battery case, and the bottom conductive elastic material being in contact with a substantially entire part of the bottom portion of the battery element; and a top conductive elastic material on a top of the battery case, and the top conductive elastic material being in contact with a substantially entire part of the top portion of the battery element.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
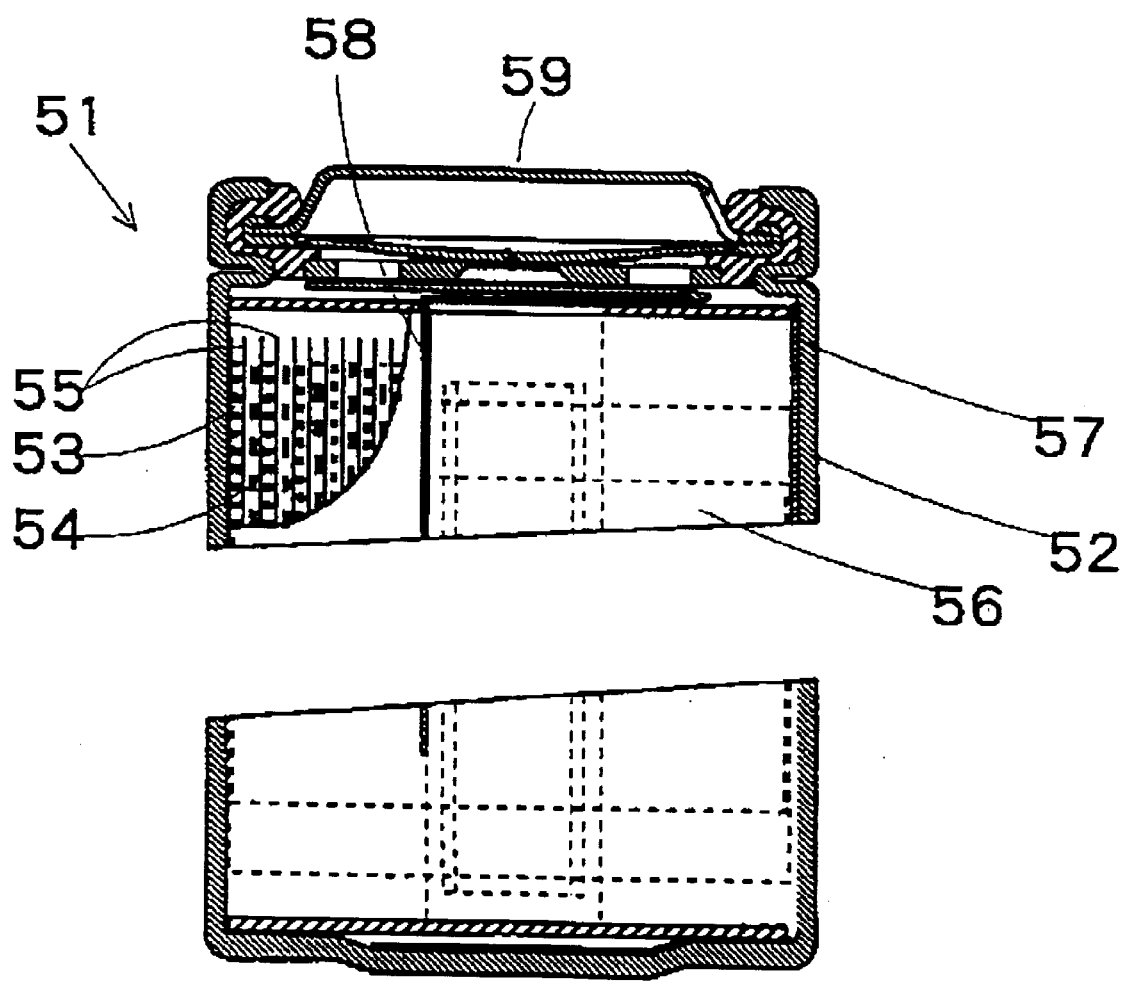
FIG. 1 is a fragmentary cross sectional elevation view illustrative of a conventional cylindrically shaped nonaqueous electrolyte secondary battery.

The present invention provides a nonaqueous electrolyte secondary battery comprising: a battery case; a battery element accommodated in the battery case, the battery element comprising laminations of a first polarity type electrode, a second polarity type electrode and a separator sandwiched between the first polarity type electrode and the second polarity type electrode, the first polarity type electrode comprising a first polarity type collector which is provided with at least a first polarity type electrode active material layer except for a first side region extending along one side of the first polarity type collector, and the second polarity type electrode comprising a second polarity type collector which is provided with at least a second polarity type electrode active material layer except for a second side region extending along one side of the second polarity type collector, the first side region of the first polarity type collector projecting from first side edge of the separator and the second side region of the second polarity type collector projecting from second side edge of the separator, so that the battery element has a bottom portion which comprises the first side region of the first polarity type collector and a top portion which comprises the second side region of the second polarity type collector; a bottom conductive elastic material on a bottom of the battery case, and the bottom conductive elastic material being in contact with a substantially entire part of the bottom portion of the battery element; and a top conductive elastic material on a top of the battery case, and the top conductive elastic material being in contact with a substantially entire part of the top portion of the battery element.

It is preferable to further comprise a collector over the battery element, and the collector having projecting portions entering into the top conductive elastic material to form an electrical connection between the top conductive elastic material and a battery header.

It is preferable to furthermore comprise a spring member in contact with the collector to press the collector toward the battery element.

It is preferable that each of the top and bottom conductive elastic materials comprises a fiber material made of a metal.

It is preferable that each of the top and bottom conductive elastic materials comprises a fiber material with a metal surface.

It is preferable that each of the top and bottom conductive elastic materials comprises a network-structure material made of a metal.

It is preferable that each of the top and bottom conductive elastic materials comprises a network-structure material with a metal surface.

It is preferable that each of the top and bottom conductive elastic materials comprises an expanded metal made of a metal.

It is preferable that each of the top and bottom conductive elastic materials comprises an expanded metal with a metal surface.

It is preferable that the second polarity type electrode active material layer is smaller in width than the first polarity type electrode active material layer, and an edge of the second polarity type electrode active material layer is not aligned to an edge of the first polarity type electrode active material layer.

Figure 2:
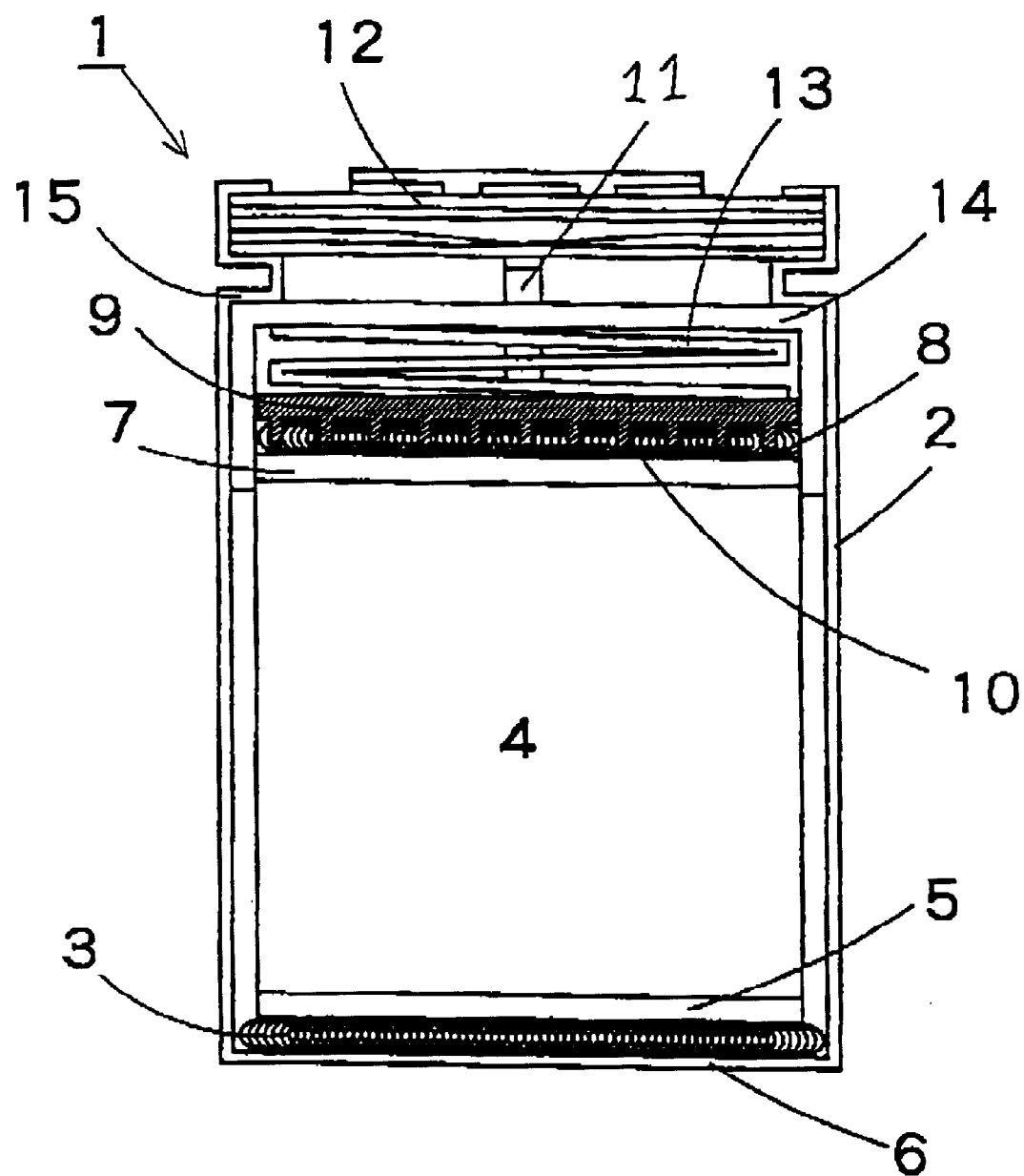
FIG. 2 is a cross sectional elevation view illustrative of a novel nonaqueous electrolyte secondary battery in a preferred embodiment in accordance with the present invention.

A first embodiment according to the present invention will be described in detail with reference to the drawings. FIG. 2 is a cross sectional elevation view illustrative of a novel nonaqueous electrolyte secondary battery in a preferred embodiment in accordance with the present invention. A novel nonaqueous electrolyte secondary battery 1 comprises a battery can 2 which accommodates a battery element 4. The battery can 2 has a bottom 6 which has a bottom conductive elastic body 3. The battery element 4 is supported over the bottom conductive elastic body 3. The battery can 2 serves as a battery case. The battery can 2 is cylindrically shaped. The battery element 4 is also cylindrically shaped. The battery element 4 comprises laminations of a positive electrode collector, a negative electrode collector and a separator sandwiched by them, wherein the laminations are winded in the form of cylinder. A width direction of the positive and negative electrode collectors and the separator is parallel to a direction of an axis of the cylinder of the battery element 4. The positive electrode collector has a positive electrode collector projecting part 7 which projects upwardly from the side edge of the separator. The negative electrode collector has a negative electrode collector projecting part 5 which projects downwardly from the side edge of the separator. The negative electrode collector projecting part 5 is directly contact with the bottom conductive elastic body 3, so that the bottom conductive elastic body 3 forms a conductive connection between the bottom 6 of the battery can 2 and the negative electrode collector projecting part 5 of the battery element 4. A top conductive elastic body 8 is provided on the positive electrode collector projecting part 7 of the battery element 4. The top conductive elastic body 8 is directly contact with the positive electrode collector projecting part 7 of the battery element 4 to form a conductive connection between them. A collector 9 is provided over the top conductive elastic body 8. The collector 9 has projecting portions 10 which are engaged into the top conductive elastic body 8, so that the projecting portions 10 form conductive connections between the collector 9 and the top conductive elastic body 8. The collector 9 is also provided with a tab 11 which is connected to an electrode header 12 which also serves as an external connecting terminal.

The collector 9 may preferably be formed of the same material as the top conductive elastic body 8. The projecting portions 10 may preferably have a sharply pointed top so as to allow the projecting portions 10 to easily enter into the top conductive elastic body 8. It is preferable that the projecting portions 10 are distributed uniformly over the entire surface of the top conductive elastic body 8, so that a distribution density of the projecting portions 10 is uniform over the entire surface of the top conductive elastic body 8. It is necessary that the height of the projecting portions 10 is smaller than a thickness of the top conductive elastic body 8 pressed.

A spring 13 is provided over the collector 9. An insulating cap 14 is provided which is connected to a terminal of one end of the spring 13. The insulation cap 14 is fixed by a stepped portion 15 provided in the battery can 2.

The one end of the spring 13 is fixed by the insulation cap 14. The battery element 4 is pressed by the spring function so as to ensure the conductive contact of the battery element 4 to the bottom conductive elastic body 3 and the top conductive elastic body 8. The spring 13 may comprise a coil spring or a flat spring.

The projecting portions 10 of the collector 9 are engaged within the top conductive elastic body 8. The projecting portions 10 serve as the conductive contacts between the top conductive elastic body 8 and the collector 9. The tab 11 provided to the collector 9 is connected to an electrode header 12 which also serves as an external connector terminal.

As a result, a conductive connection is formed between the entire of the negative electrode collector projecting part 5 and the bottom conductive elastic body 3. A conductive connection is formed between the entire of the positive electrode collector projecting part 7 and the top conductive elastic body 8. This means that a short conductive connection is formed at a short distance between the entire of the reacting portion of the battery element to the conductive connecting member, thereby allowing a highly efficient current flow between the battery element an the battery reactive portion.

The battery element is held by elastic forces of the bottom conductive elastic body 3, the top conductive elastic body 8 and the spring 13, so as to prevent the conductive connection portions from being broken due to externally applied vibration and also prevent the active material from being removed from the surfaces of the positive electrode collector and the negative electrode collector.

The conductive elastic body used in this nonaqueous electrolyte secondary battery may comprise a material with an elasticity and an electrical conductivity, such as a metal with an elasticity and an elastic material with a metal surface, for example, fibers made of a metal or fibers with metal surface, so called as metal wool, expanded metal made of metal or expanded metal with metal surface, network-structure made of metal or network structure with metal surface, spring member made of metal or spring member with metal surface, synthetic fibers with metal surface, natural fibers with metal surface, or one obtained by burring metal-surfaced fibers.

The cross sectional shape of this member may be circle, rectangle, polygons such as hexagon and octagon. The polygonal cross sectional shaped members have larger contact areas than the circle cross sectional shaped members, whereby the polygonal cross sectional shaped members are improved in conductive contact.

The conductive elastic body may comprise the above fibers having a smaller diameter to form inner spaces of the fiber-network, so that the inner spaces capture an electrolytic solution to suppress a reduction of the electrolytic solution due to decomposition of the electrolytic solution by a discharge of the battery in long time.

The conductive elastic body in contact with the positive electrode collector may preferably be made of highly conductive materials free of elution at a potential of the positive electrode, for example, aluminum and titanium. The conductive elastic body in contact with the negative electrode collector may preferably be made of a highly stable material at a potential of the negative electrode such as stainless and nickel.

The nonaqueous electrolyte secondary battery may be formed as follows. Laminations of sheet-shaped positive and negative electrodes and a sheet-shaped separator sandwiched between them are winded to form a cylindrically shaped battery element having one end where the positive electrode collector projects and another end where the negative electrode collector projects.

The bottom conductive elastic body is placed on a bottom of the battery can

The battery element is placed on the conductive elastic body in the battery can.

The top conductive elastic body is placed on the top of the battery element and also an electrolytic solution is injected.

The collector with the tub is placed on the top conductive elastic body, and further the insulation cap with the spring is placed.

The top of the battery can is subjected to a grooving process to form a stepped portion on an inner wall of the battery, so that the insulating cap is fixed.

The tub provided to the collector is bonded to the battery header.

The battery header is caulked with a gasket to seal the battery.

Figure 3A:
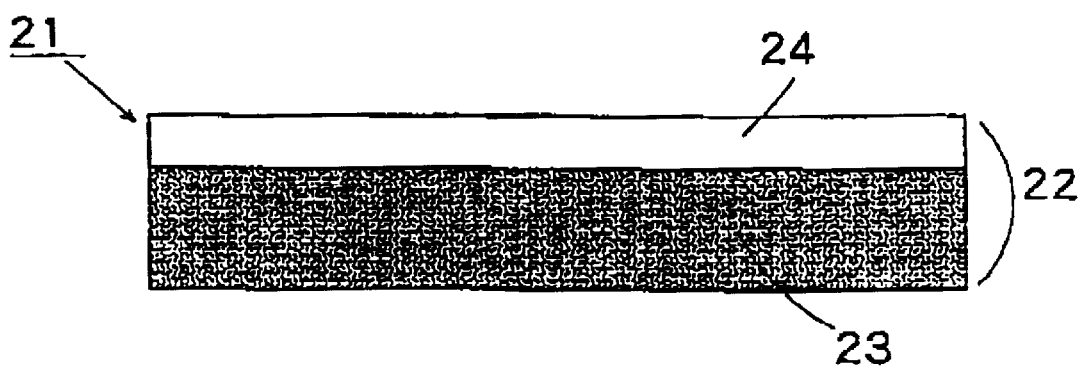
FIG. 3A is a plane view illustrative of a positive electrode of the battery of FIG. 2.

FIG. 3A is a plane view illustrative of a positive electrode of the battery of FIG. 2. A positive electrode 21 comprises a stripe-shaped positive electrode collector 22 such as an aluminum foil. A positive electrode active material layer 23 is partially formed on the positive electrode collector 22 expect over a side region 24 along one side of the positive electrode collector 22. The positive electrode active material layer 23 may be prepared by admixing a conductive material with a lithium transition metal complex oxide.

Figure 3B:
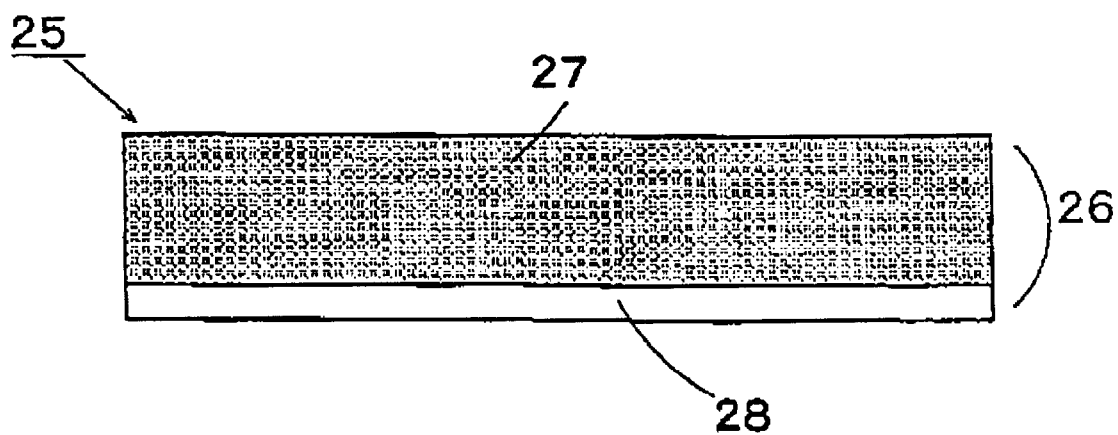
FIG. 3B is a plane view illustrative of a negative electrode of the battery of FIG. 2.

FIG. 3B is a plane view illustrative of a negative electrode of the battery of FIG. 2 A negative electrode 25 comprises a stripe-shaped negative electrode collector 26 such as an aluminum foil. A negative electrode active material layer 27 is partially formed on the negative electrode collector 26 expect over a side region 28 along one side of the negative electrode collector 26. The negative electrode active material layer 27 may be made of a material such as carbon material which is capable of doping and dedoping lithium ions.

A part of the side region 24 of the positive electrode collector 22 may project from the edge of the separator. A part of the side region 28 of the negative electrode collector 26 may project from the edge of the separator.

Figure 4:
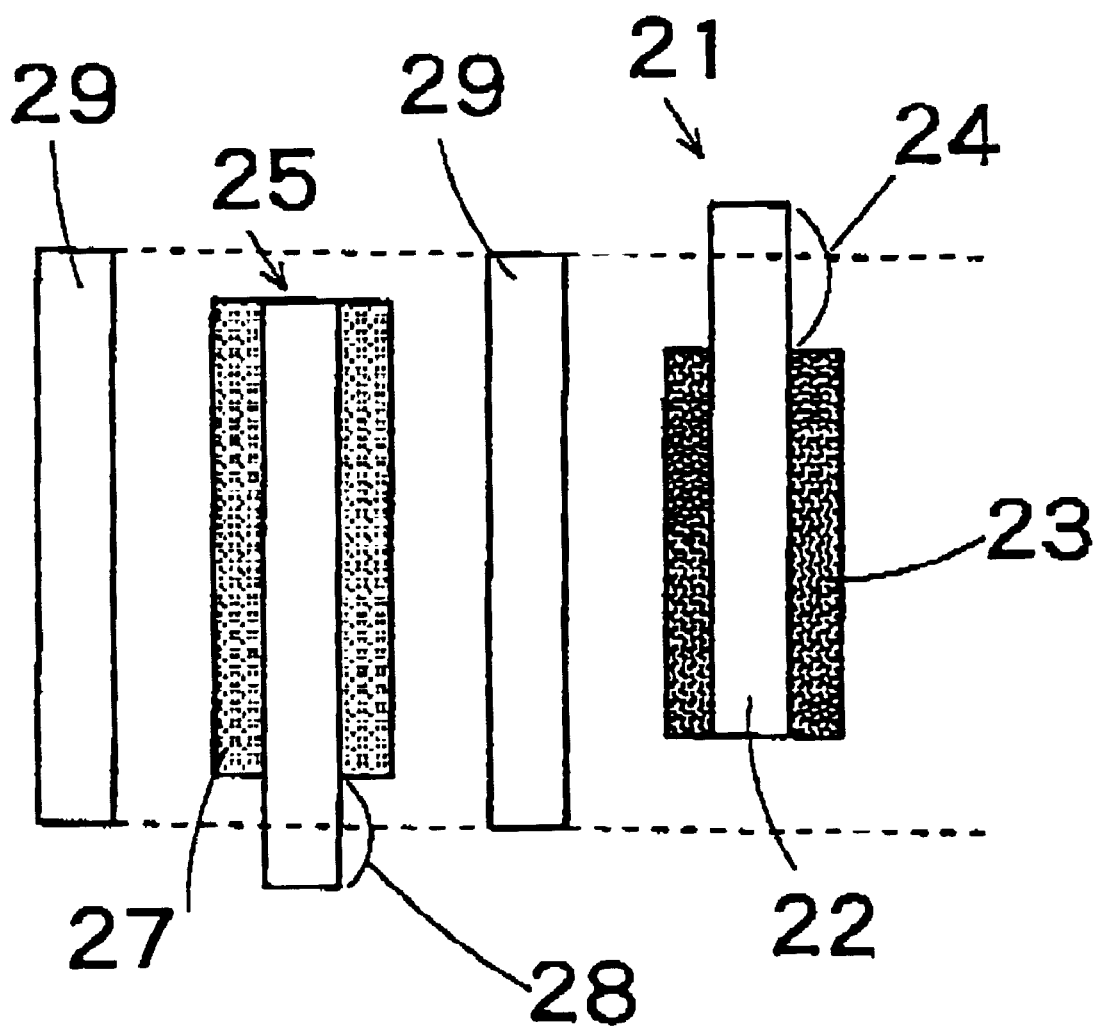
FIG. 4 is a view illustrative of a sectional structure of the battery of FIG. 2.

FIG. 4 is a view illustrative of a sectional structure of the battery of FIG. 2. A part of the side region 24 of the positive electrode collector 22 of the positive electrode 21 projects from the edge of the separator 29. A part of the side region 28 of the negative electrode collector 26 of the negative electrode 21 projects from the edge of the separator 29.

The positive electrode active material layer 23 is different in width from the negative electrode active material layer 27. The edge of the positive electrode active material layer 23 is not aligned to the edge of the negative electrode active material layer 27. The edge of the positive electrode active material layer 23 is preferably positioned inside of the negative electrode active material layer 27 in view of safety.

The projecting portions of the positive electrode collector and the negative electrode collector from the edges of the separator are preferably in contact directly with the conductive elastic material for input and output of the current when the battery is assembled. When the battery element is inserted into the battery can, then it is necessary to prevent that the projecting portions of the collector from being in contact with each other, but the projecting portions of the collector are made into contact directly with the conductive elastic body. For this purpose, it is preferable to adjust size of the projecting portions from the edge of the collector in consideration of the strength of the edge surface of the cylindrically shaped battery element and the rigidity of the separator. It is, for example, that the dimension of the projecting portions of the positive electrode collector and the negative electrode collector may be equivalent to or smaller than the thickness of the separator As the rolling or winding number is small, then the strength to the pressure applied to the edge is small. It is, therefore, preferable that the rolling or winding number is not less than 16, and a diameter of the roll stricture or the cylindrically shaped battery element is not less than 18 millimeters.

If the bottom projecting portion downwardly projecting from the separator is so large as allowing the bottom projecting portion to fold, then the projecting portions are made into contact with each other to form conductive contact between them, whereby a current input or output may be allowed through the projecting portions. If the diameter of the battery and the height of the battery are small and further the winding tension of the battery element is small, then the electrolytic solution is likely to be immersed into the battery element. For this reason, even if the projecting portions of the collectors arc folded, then it is ensured that the electrolytic solution is immersed into the battery element.

If the diameter of the battery and the height of the battery are large and further the winding tension of the battery element is large, then the diameter of individual elements constituting the conductive elastic body is made small, so that even if the projecting portions of the collector are folded, it is possible to ensure a path for the electrolytic solution into the cylindrically shaped battery element. Namely, it is possible to ensure the electrolytic solution path between the collectors. Namely, a sufficient amount of the electrolytic solution may be supplied to the cylindrically shaped battery element.

The conductive elastic body used in this nonaqueous electrolyte secondary battery may comprise a material with an elasticity and an electrical conductivity, such as a metal with an elasticity and an elastic material with a metal surface, for example, fibers made of a metal or fibers with metal surface, so called as metal wool, expanded metal made of metal or expanded metal with metal surface, network-structure made of metal or network structure with metal surface, spring member made of metal or spring member with metal surface, synthetic fibers with metal surface, natural fibers with metal surface, or one obtained by burring metal-surfaced fibers.

The conductive elastic body in contact with the positive electrode collector may preferably be made of highly conductive materials free of elution at a potential of the positive electrode, for example, aluminum and titanium. The conductive elastic body in contact with the negative electrode collector may preferably be made of a highly stable material at a potential of the negative electrode such as stainless and nickel.

The amount in use of the conductive elastic body may be determined in consideration of the contact area between the conductive elastic body and the collector or the battery can.

Figure 5:
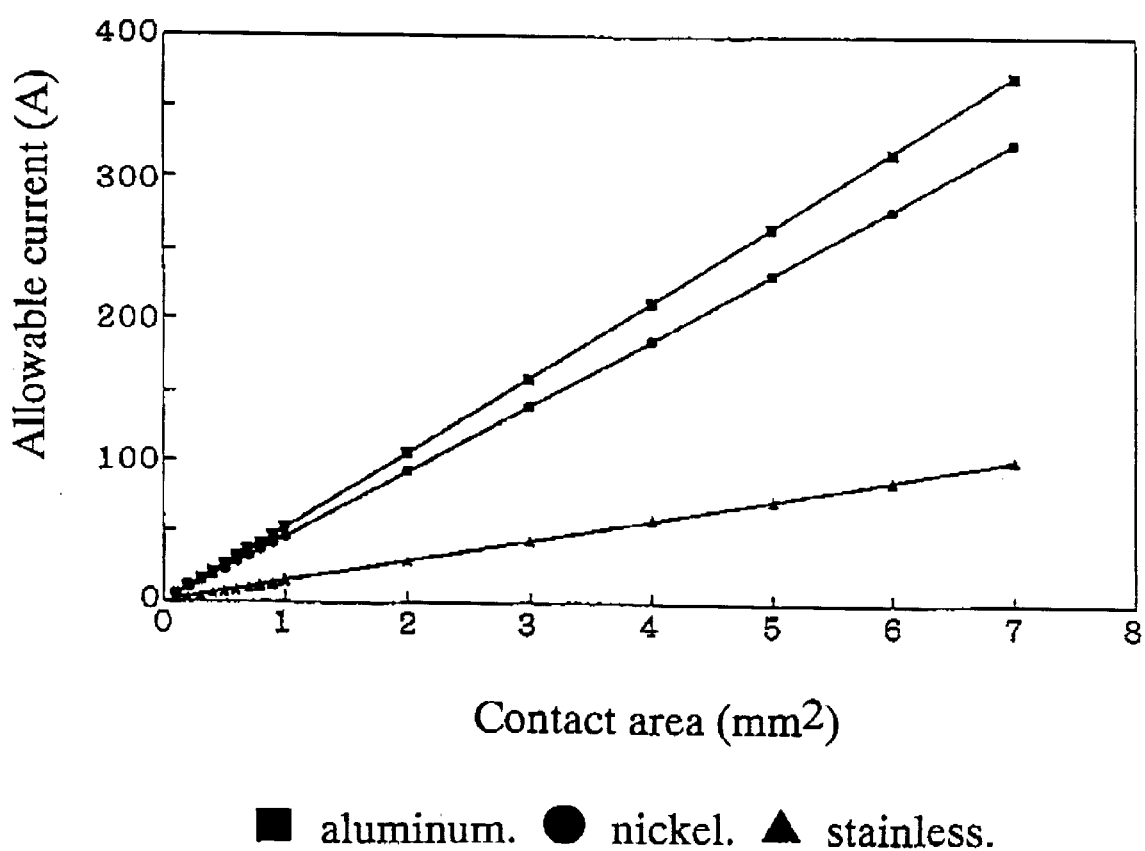
FIG. 5 is a graph illustrative of variations of an allowable current versus a contact area in cases of various materials such as aluminum, nickel and stainless of the novel battery.

FIG. 5 is a graph illustrative of variations of an allowable current versus a contact area in cases of various materials such as aluminum, nickel and stainless of the novel battery. ■ represents aluminum. ● represents nickel. ▲ represents stainless. If the aluminum is used, then the allowable current is most high. If the nickel is used, then the allowable current is higher than when the stainless is used. If the stainless is used, no problem is raised because an entire of the bottom is made into contact with the conductive elastic body.

In the forgoing embodiment, the battery can is electrically connected to the negative electrode collector. The present invention is, needless to say, applicable to when the battery can serves as a positive electrode. In this case, the battery can may be made of aluminum. The above descriptions may also be applicable to this case, provided that the positive and negative polarities are reversed.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A nonaqueous electrolyte secondary battery comprising:
    a battery case;
    a battery element accommodated in said battery case, said battery element comprising laminations of a first polarity electrode, a second polarity electrode and a separator sandwiched between said first polarity electrode and said second polarity electrode, said first polarity electrode comprising a first polarity collector which is provided with at least a first polarity electrode active material layer except on a first end region of said first polarity collector, and said second polarity electrode comprising a second polarity collector which is provided with at least a second polarity electrode active material layer except on a second end region of said second polarity collector, said first end region of said first polarity collector projecting beyond a first edge of said separator and said second end region of said second polarity collector projecting beyond a second edge of said separator opposite said first edge, so that said battery element has a bottom portion which comprises said first end region of said first polarity collector and a top portion which comprises said second end region of said second polarity collector;
    a bottom conductive elastic material on a bottom of said battery case, and said bottom conductive elastic material being in contact with a substantially entire part of said bottom portion of said battery element; and
    a top conductive elastic material on a top of said battery case, and said top conductive elastic material being in contact with a substantially entire part of said top portion of said battery element.

2. The nonaqueous electrolyte secondary battery as claimed in claim 1, further comprising a third collector over said battery element, said third collector having projecting portions entering into said top conductive elastic material to form an electrical connection between said top conductive elastic material and a battery header.

3. The nonaqueous electrolyte secondary battery as claimed in claim 2, further comprising a further spring member in contact with said third collector to press said third collector toward said battery element.

4. The nonaqueous electrolyte secondary battery as claimed in claim 1, wherein each of said top and bottom conductive elastic materials comprises a fiber material made of a metal.

5. The nonaqueous electrolyte secondary battery as claimed in claim 1, wherein each of said top and bottom conductive elastic materials comprises a fiber material with a metal surface.

6. The nonaqueous electrolyte secondary battery as claimed in claim 1, wherein each of said top and bottom conductive elastic materials comprises a metal grid.

7. The nonaqueous electrolyte secondary battery as claimed in claim 1, wherein each of said top and bottom conductive elastic materials comprises a grid with a metal surface.

8. The nonaqueous electrolyte secondary battery as claimed in claim 1, wherein each of said top and bottom conductive elastic materials comprises an expanded metal made of a metal.

9. The nonaqueous electrolyte secondary battery as claimed in claim 1, wherein each of said top and bottom conductive elastic materials comprises an expanded metal with a metal surface.

10. The nonaqueous electrolyte secondary battery as claimed in claim 1, wherein said second polarity electrode active material layer is smaller in width than said first polarity electrode active material layer.

11. A nonaqueous electrolyte secondary battery comprising:
    a first electrode that includes a first collector and a first active electrode material covering at least one side of said first collector except at a first end region that includes a first end of the first collector and portions of said at least one side of said first collector and an opposite side thereof that are directly adjacent to said first end of said first collector;
    a second electrode that includes a second collector and a second active electrode material covering at least one side of said second collector except at a second end region that includes a second end of the second collector and portions of said at least one side of said second collector and an opposite side thereof that are directly adjacent to said second end of said second collector, said second electrode having a polarity opposite a polarity of said first electrode;
    a separator that has opposite first and second edges and that is between said first electrode and said second electrode, said first end region projecting beyond said first edge of said separator and said second end region projecting beyond said second edge of said separator, said first edge of said separator and said first end region being at one end of the battery, said second edge of said separator and said second end region being at another end of the battery;
    a first conductive elastic material at said one end of the battery and contacting said first collector at said first end region; and
    a second conductive elastic material at said another end of the battery and contacting said second collector at said second end region.

12. The secondary battery of claim 11, wherein said first and second electrodes and said separator are coiled into a cylindrical shape.

13. The secondary battery of claim 11, wherein said first end region projects beyond said first edge of said separator by a distance that is no greater than a thickness of said separator and said second end region projects beyond said second edge of said separator by a distance that is no greater than the thickness of said separator.

14. The secondary battery of claim 11, wherein said first active electrode material covers both sides of said first collector except at said first end region and said second active electrode material covers both sides of said second collector except at said second end region.

15. The secondary battery of claim 11, further comprising a conductive cover that directly contacts said first conductive elastic material at said one end of the battery, said conductive cover having plural projections that extend into said first conductive material.

16. The secondary battery of claim 15, further comprising an external terminal, a spring between said conductive cover and said external terminal, and a lead that electrically connects said external terminal to said conductive cover.

* * * * *